United States Patent
Rajagopalan et al.

(10) Patent No.: US 10,741,909 B2
(45) Date of Patent: Aug. 11, 2020

(54) ELECTRONIC DEVICES HAVING MULTI-BAND SLOT ANTENNAS

(71) Applicant: Apple Inc., Cupertino, CA (US)

(72) Inventors: Harish Rajagopalan, San Jose, CA (US); Pietro Romano, Foster City, CA (US); Umar Azad, Santa Clara, CA (US); David Garrido Lopez, Campbell, CA (US); Lu Zhang, Shanghai (CN); Rodney A. Gomez Angulo, Santa Clara, CA (US); Mario Martinis, Cupertino, CA (US); Carlo Di Nallo, Belmont, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 241 days.

(21) Appl. No.: 15/716,363

(22) Filed: Sep. 26, 2017

(65) Prior Publication Data

US 2019/0097314 A1    Mar. 28, 2019

(51) Int. Cl.
| | | |
|---|---|---|
| H01Q 1/24 | (2006.01) | |
| H01Q 1/52 | (2006.01) | |
| H01Q 13/10 | (2006.01) | |
| H01Q 5/50 | (2015.01) | |
| H01Q 5/30 | (2015.01) | |

(Continued)

(52) U.S. Cl.
CPC ............. *H01Q 1/521* (2013.01); *H01Q 1/243* (2013.01); *H01Q 5/30* (2015.01); *H01Q 5/35* (2015.01); *H01Q 5/50* (2015.01); *H01Q 13/10* (2013.01); *H04M 1/026* (2013.01); *H04M 1/0266* (2013.01)

(58) Field of Classification Search
CPC ........... H01Q 1/521; H01Q 5/35; H01Q 5/30; H01Q 5/50; H01Q 1/243; H01Q 13/10
See application file for complete search history.

(56) References Cited

U.S. PATENT DOCUMENTS

| | | |
|---|---|---|
| 8,798,554 B2 | 8/2014 | Darnell et al. |
| 9,024,823 B2 | 5/2015 | Bevelacqua |

(Continued)

OTHER PUBLICATIONS

Pietro Romano et al., U.S. Appl. No. 15/274,328., filed Sep. 23, 2016.

(Continued)

*Primary Examiner* — Dieu Hien T Duong
(74) *Attorney, Agent, or Firm* — Treyz Law Group, P.C.; Michael H. Lyons; Matthew R. Williams

(57) ABSTRACT

An electronic device may have peripheral conductive structures and a conductive layer that define edges of a slot element for a slot antenna. The slot element may be configured to cover wireless communications in a 1575 MHz satellite navigation band and 2.4 GHz and 5 GHz wireless local area network bands. A tuning circuit may be coupled across the slot approximately half way across the length of the slot. The antenna tuning circuit may include an inductor coupled in series with a notch filter (in scenarios where the slot is long enough to cover the 1575 MHz satellite navigation band in its fundamental mode) or may include a capacitor coupled in series with a notch or low pass filter. The fundamental mode and one or more harmonic modes of the slot element may cover the satellite navigation and wireless local area network bands.

22 Claims, 12 Drawing Sheets

(51) Int. Cl.
*H01Q 5/35* (2015.01)
*H04M 1/02* (2006.01)

(56) References Cited

U.S. PATENT DOCUMENTS

| | | |
|---|---|---|
| 9,153,874 B2 | 10/2015 | Ouyang et al. |
| 9,318,793 B2 | 4/2016 | Zhu et al. |
| 9,543,660 B2 | 1/2017 | Rajagopalan et al. |
| 2013/0157717 A1* | 6/2013 | Yu .................. H04B 1/0057 455/553.1 |
| 2013/0203364 A1* | 8/2013 | Darnell .................. H01Q 1/243 455/77 |
| 2014/0218244 A1* | 8/2014 | Chang .................. H01Q 13/10 343/702 |
| 2016/0211570 A1 | 7/2016 | Jin et al. |
| 2017/0264001 A1 | 9/2017 | Azad et al. |
| 2018/0076504 A1* | 3/2018 | Lo Hine Tong ......... H01Q 1/24 |

OTHER PUBLICATIONS

Harish Rajagopalan et al., U.S. Appl. No. 15/275,192., filed Sep. 23, 2016.

\* cited by examiner

ELECTRONIC DEVICES HAVING MULTI-BAND SLOT ANTENNAS

BACKGROUND

This relates to electronic devices, and more particularly, to antennas for electronic devices with wireless communications circuitry.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with a satisfactory efficiency bandwidth.

It would therefore be desirable to be able to provide improved wireless communications circuitry for wireless electronic devices.

SUMMARY

An electronic device may have a housing with peripheral conductive structures and a conductive layer extending between the peripheral conductive structures. The conductive layer and the peripheral conductive structures may define edges of a slot element in a slot antenna. One or more antenna feeds for the slot antenna may be coupled across the slot element.

Radio-frequency transceiver circuitry may be coupled to the antenna feeds and may be configured to convey radio-frequency signals in a first frequency band (e.g., a 1575 MHz satellite navigation band), a second frequency band that is greater than the second frequency band (e.g., a 2.4 GHz wireless local area network band), and a third frequency band that is greater than the second frequency band (e.g., a 5 GHz wireless local area network band) using the slot element. An antenna tuning circuit for the slot antenna may be coupled across the slot element approximately half way across the length of the slot element.

In one suitable arrangement, the antenna tuning circuit may include an inductor coupled in series with a notch filter having a stop band that overlaps with the first frequency band and that does not overlap with the second and third frequency bands. The slot element may have a fundamental mode configured to cover the first frequency band and a second harmonic of the fundamental mode may be configured to cover the second frequency band.

In another suitable arrangement, the antenna tuning circuit may include a capacitor and a filter coupled in series between the peripheral conductive structures and the conductive layer. The filter may include a notch filter having a stop band that overlaps with the second and third frequency bands and that does not overlap with the first frequency band. If desired, the filter may include a low pass filter that is configured to pass signals in the first frequency band and to block signals in the second and third frequency bands. The fundamental mode of the slot element may be configured to cover the first and second frequency bands and a first harmonic of the fundamental mode may be configured to cover the third frequency band. In this way, the electronic device may use a single rectangular slot antenna to perform wireless communications over three or more frequency bands while maximizing device area for an active area of a display device, for example.

DETAILED DESCRIPTION

Figure 1:
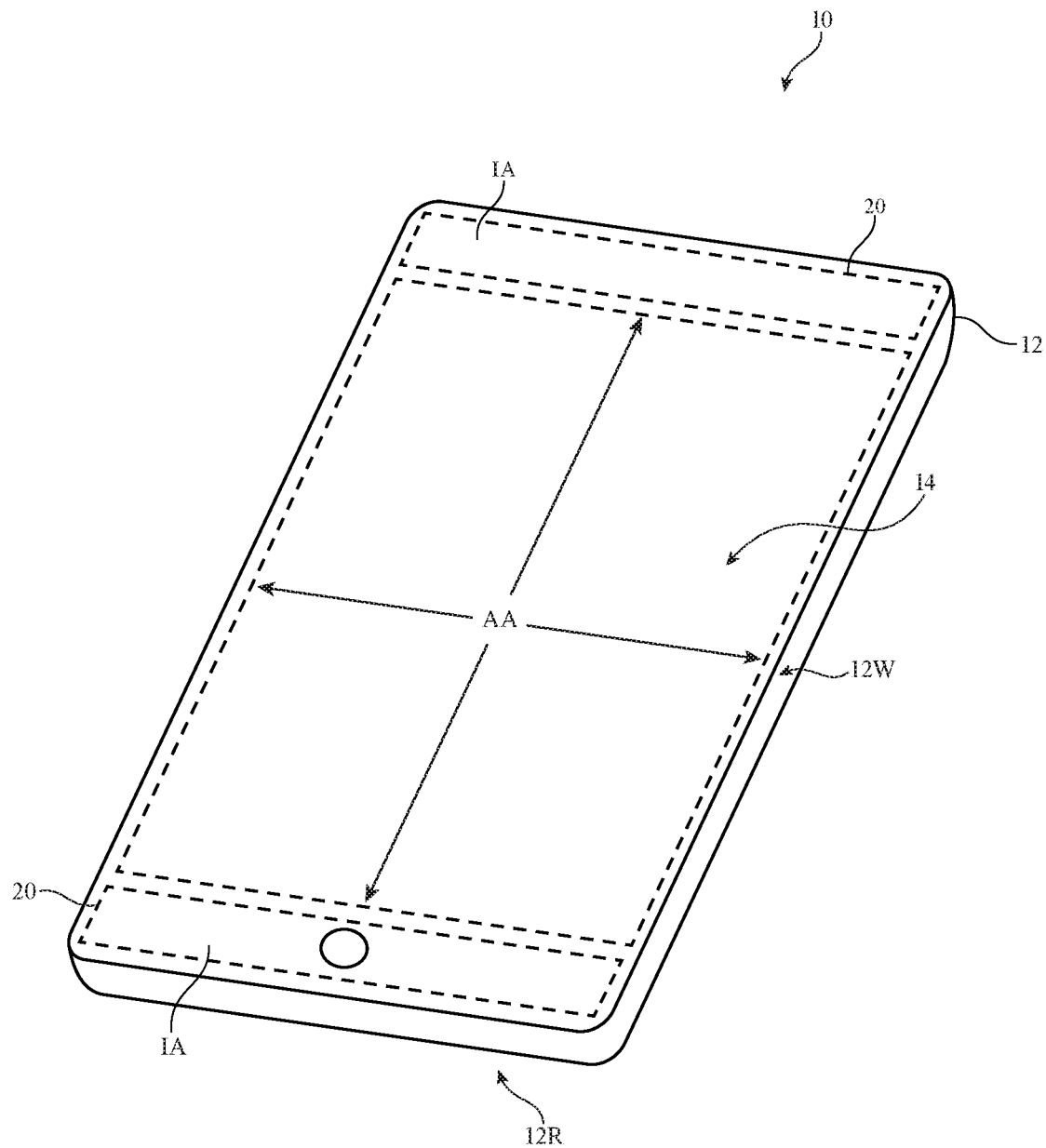
FIG. 1 is a perspective view of an illustrative electronic device in accordance with an embodiment.

An electronic device such as electronic device 10 of FIG. 1 may be provided with wireless circuitry that includes antennas. The antennas may be used to transmit and receive wireless signals.

The wireless circuitry of device 10 may handle one or more communications bands. For example, the wireless circuitry of device 10 may include a Global Position System (GPS) receiver that handles GPS satellite navigation system signals at 1575 MHz or a GLONASS receiver that handles GLONASS signals at 1609 MHz. Device 10 may also contain wireless communications circuitry that operates in communications bands such as cellular telephone bands and wireless circuitry that operates in communications bands such as the 2.4 GHz Bluetooth® band and the 2.4 GHz and 5 GHz WiFi® wireless local area network bands (sometimes referred to as IEEE 802.11 bands or wireless local area network communications bands). Device 10 may also contain wireless communications circuitry for implementing near-field communications at 13.56 MHz or other near-field communications frequencies. If desired, device 10 may include wireless communications circuitry for communicating at 60 GHz, circuitry for supporting light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes a display such as display 14. Display 14 may be mounted in a housing such as housing 12. Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar rear housing wall such as wall 12R. The rear housing wall may have slots that pass entirely through the rear housing wall and that therefore separate housing wall portions (and/or sidewall portions) of housing 12 from each other. The rear housing wall may include conductive portions and/or dielectric portions. If desired, the rear housing wall may include a planar metal layer covered by a thin layer or coating of dielectric such as glass, plastic, sapphire, or ceramic. Housing 12 may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Housing 12 may include peripheral housing structures such as structures 12W (sometimes referred to herein as peripheral structures 12W). Structures 12W may run around the periphery of device 10 and display 14. In configurations in which device 10 and display 14 have a rectangular shape with four edges, structures 12W may be implemented using peripheral housing structures that have a rectangular ring shape with four corresponding edges and that extend from rear housing wall 12R to the front face of device 10 (as an example). Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral housing structures 12W may be formed of a conductive material such as metal and may therefore sometimes be referred to as peripheral conductive housing structures, conductive housing structures, peripheral metal structures, peripheral conductive sidewalls, peripheral conductive housing sidewalls, peripheral conductive sidewall structures, sidewall structures, sidewalls, housing sidewalls, housing sidewall structures, or a peripheral conductive housing member (as examples). Peripheral housing structures 12W may be formed from a metal such as stainless steel, aluminum, or other suitable materials. One, two, or more than two separate structures may be used in forming peripheral housing structures 12W.

It is not necessary for peripheral housing structures 12W to have a uniform cross-section. For example, the top portion of peripheral housing structures 12W may, if desired, have an inwardly protruding lip that helps hold display 14 in place. The bottom portion of peripheral housing structures 12W may also have an enlarged lip (e.g., in the plane of the rear surface of device 10). Peripheral housing structures 12W may have substantially straight vertical sidewalls, may have sidewalls that are curved, or may have other suitable shapes. In some configurations (e.g., when peripheral housing structures 12W serve as a bezel for display 14), peripheral housing structures 12W may run around the lip of housing 12 (i.e., peripheral housing structures 12W may cover only the edge of housing 12 that surrounds display 14 and not the rest of the sidewalls of housing 12).

If desired, rear housing wall 12R may be formed from a metal such as stainless steel or aluminum (rear housing wall 12R may sometimes be referred to herein as conductive rear housing wall 12R, rear wall 12R, or conductive rear wall 12R). Conductive rear housing wall 12R may lie in a plane that is parallel to display 14. In configurations for device 10 in which rear housing wall 12R is formed from metal, it may be desirable to form parts of peripheral conductive housing structures 12W as integral portions of the housing structures forming conductive rear housing wall 12R of housing 12. For example, conductive rear housing wall 12R of device 10 may be formed from a planar metal structure and portions of peripheral housing structures 12W on the sides of housing 12 may be formed as flat or curved vertically extending integral metal portions of the planar metal structure (e.g., conductive housing structures 12R and 12W may be formed from a continuous piece of metal in a unibody configuration). Housing structures such as these may, if desired, be machined from a block of metal and/or may include multiple metal pieces that are assembled together to form housing 12. Conductive rear housing wall 12R may have one or more, two or more, or three or more portions. Peripheral conductive housing structures 12W and/or the conductive rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide structures 12W and/or 12R from view of the user).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may have an active area AA that includes an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button such as button 16. An opening may also be formed in the display cover layer to accommodate ports such as a speaker port. Openings may be formed in housing 12 to form communications ports (e.g., an audio jack port, a digital data port, etc.) and/or audio ports for audio components such as a speaker and/or a microphone if desired.

Display 14 may have an inactive border region that runs along one or more of the edges of active area AA. Inactive area IA may be free of pixels for displaying images and may overlap circuitry and other internal device structures in housing 12. To block these structures from view by a user of device 10, the underside of the display cover layer or other layer in display 14 that overlaps inactive area IA may be coated with an opaque masking layer in inactive area IA. The opaque masking layer may have any suitable color.

The antennas of the wireless circuitry in device 10 can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures.

Gaps may be formed in the conductive structures that divide the conductive structures into segments. As an example, gaps may be formed between conductive structures such as portions of conductive rear housing wall 12R, one or more peripheral conductive housing sidewalls 12W, and/or other conductive structures in device 10. The gaps may be used in forming one or more antennas for device 10.

As an example, housing 12 may have four peripheral edges (e.g., peripheral conductive housing sidewalls 12W) as shown in FIG. 1 and one or more antennas may be located along one or more of these edges. As shown in the illustrative configuration of FIG. 1, antennas may, if desired, be mounted in regions 20 along opposing peripheral edges of housing 12 (as an example). The antennas may include antenna resonating elements that emit and receive wireless signals through the front of device 10 (i.e., through inactive portions IA of display 14) and/or from the rear and sides of device 10. In practice, active components within active display area AA may block or otherwise inhibit signal reception and transmission by the antennas. By placing the antennas within regions 20 of inactive area IA of display 14, the antennas may freely pass signals through the display without the signals being blocked by active display circuitry. Antennas may also be mounted in other portions of device 10, if desired. The configuration of FIG. 1 is merely illustrative.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area of regions 20 that is available for forming antennas within device 10. In general, antennas that are provided with larger operating volumes or spaces may have higher bandwidth efficiency than antennas that are provided with smaller operating volumes or spaces. If care is not taken, increasing the size of active area AA may reduce the operating space available to the antennas, which can undesirably inhibit the efficiency bandwidth of the antennas (e.g., such that the antennas no longer exhibit satisfactory radio-frequency performance). It would therefore be desirable to be able to provide antennas that occupy a small amount of space within device 10 (e.g., to allow for as large of a display active area AA as possible) while still allowing the antennas to operate with optimal efficiency bandwidth.

Figure 2:
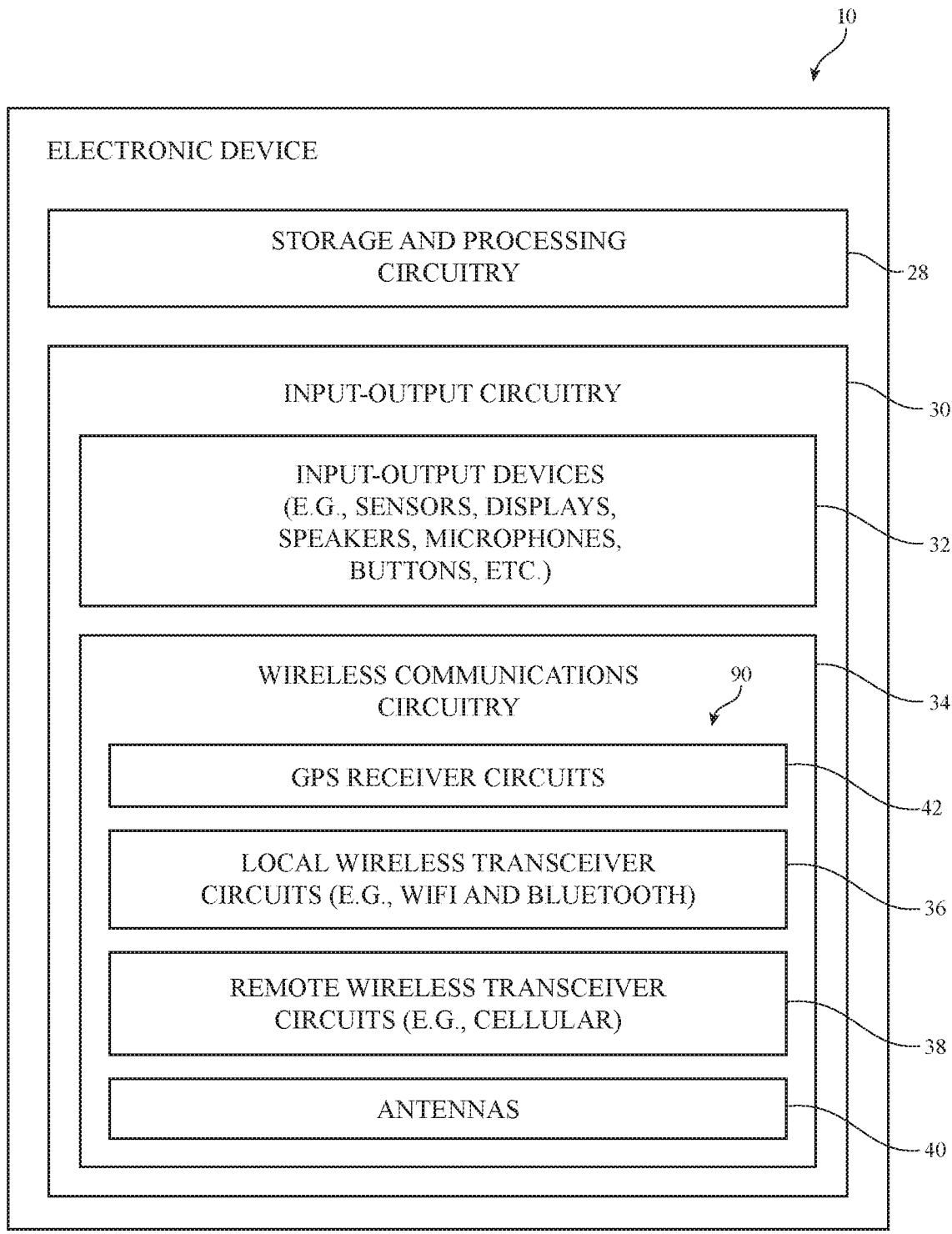
FIG. 2 is a schematic diagram of illustrative circuitry in an electronic device in accordance with an embodiment.

A schematic diagram showing illustrative components that may be used in device 10 of FIG. 1 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, multiple-input and multiple-output (MIMO) protocols, antenna diversity protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, position and orientation sensors (e.g., sensors such as accelerometers, gyroscopes, and compasses), capacitance sensors, proximity sensors (e.g., capacitive proximity sensors, light-based proximity sensors, etc.), fingerprint sensors (e.g., a fingerprint sensor integrated with a button such as button 24 of FIG. 1 or a fingerprint sensor that takes the place of button 24), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle wireless local area network (WLAN) bands such as 2.4 GHz and 5 GHz bands for WiFi® (IEEE 802.11) communications and/or wireless personal area network (WPAN) bands such as the 2.4 GHz Bluetooth® communications band. Circuitry 34 may use cellular telephone transceiver circuitry 38 for handling wireless communications in frequency ranges such as a low communications band from 700 to 960 MHz, a low-midband from 960 to 1710 MHz, a midband from 1710 to 2170 MHz, a high band from 2300 to 2700 MHz, an ultra-high band from 3400 to 3700 MHz and/or other communications bands between 600 MHz and 4000 MHz or other suitable frequencies (as examples).

Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include satellite navigation receive equipment such as global positioning system (GPS) receiver circuitry 42 for receiving GPS signals at 1575 MHz or for handling other satellite positioning data (e.g., Global Navigation Satellite System (GLONASS) signals, etc.). In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Figure 3:
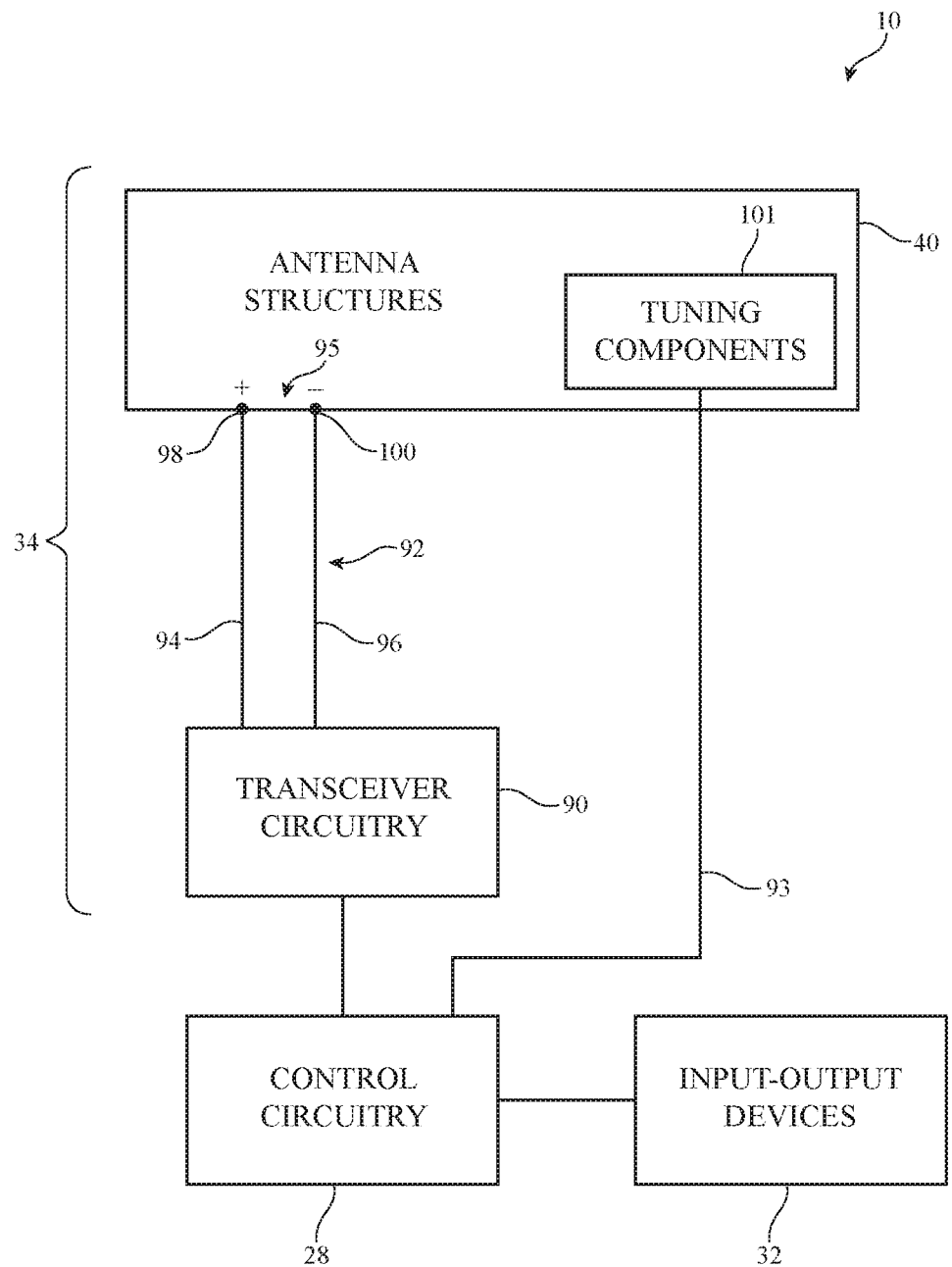
FIG. 3 is a diagram of illustrative wireless circuitry in an electronic device in accordance with an embodiment.

As shown in FIG. 3, transceiver circuitry 90 in wireless circuitry 34 may be coupled to antenna structures 40 using paths such as path 92. Wireless circuitry 34 may be coupled to control circuitry 28. Control circuitry 28 may be coupled to input-output devices 32. Input-output devices 32 may supply output from device 10 and may receive input from sources that are external to device 10.

To provide antenna structures such as antenna(s) 40 with the ability to cover communications frequencies of interest, antenna(s) 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna(s) 40 may be provided with tuning circuits such as tuning components 101 to tune antennas over communications bands of interest. Tuning components 101 may be part of a filter or impedance matching network, may be part of an antenna resonating element, may span a gap between an antenna resonating element and antenna ground, etc.

Tuning components 101 may include fixed components (e.g., inductors having a fixed inductance, resistors having a fixed resistance, capacitors having a fixed capacitance, etc.) and/or may include tunable (adjustable) components such as tunable inductors, tunable capacitors, or other tunable components. Fixed tuning components 101 may include discrete components such as surface mount technology (SMT) capacitors, resistors, and/or inductors and/or may include distributed components such distributed capacitances, resistances, and/or inductances. Adjustable tuning components 101 components may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 28 may issue control signals on one or more paths such as path 93 that adjust inductance values, capacitance values, or other parameters associated with adjustable components in tuning components 101, thereby tuning antenna structures 40 to cover desired communications bands. Fixed components in tuning components 101 may, for example, configure antennas 40 to cover one or more desired frequency bands of interest with satisfactory antenna efficiency using the same conductive structures.

Path 92 may include one or more transmission lines. As an example, signal path 92 of FIG. 3 may be a transmission line having a positive signal conductor such as line 94 and a ground signal conductor such as line 96. Signal path 92 may sometimes be referred to herein as radio-frequency transmission line 92 or transmission line 92. Transmission line 92 may include a stripline transmission line, a microstrip transmission line, waveguide transmission lines, or other transmission line structures. Transmission lines in device 10 such as transmission line 92 may be integrated into rigid and/or flexible printed circuit boards. In one suitable arrangement, transmission lines in device 10 may also include transmission line conductors (e.g., signal and ground conductors) integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintains a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network (e.g., an adjustable matching network formed using tuning components 101) may include components such as inductors, resistors, and capacitors used in matching the impedance of antenna(s) 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Transmission line 92 may be coupled to antenna feed structures associated with antenna structures 40. As an example, antenna structures 40 may form an inverted-F antenna, a slot antenna, a hybrid inverted-F slot antenna or other antenna having an antenna feed 95 with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 100. Other types of antenna feed arrangements may be used if desired. For example, antenna structures 40 may be fed using multiple feeds. The illustrative feeding configuration of FIG. 3 is merely illustrative.

Control circuitry 28 may use information from a proximity sensor (see, e.g., sensors 32 of FIG. 2), wireless performance metric data such as received signal strength information, device orientation information from an orientation sensor, device motion data from an accelerometer or other motion detecting sensor, information about a usage scenario of device 10, information about whether audio is being played through speaker 26, information from one or more antenna impedance sensors, and/or other information in determining when antenna(s) 40 is being affected by the presence of nearby external objects or is otherwise in need of tuning. In response, control circuitry 28 may adjust an adjustable inductor, adjustable capacitor, switch, or other tunable component 101 and/or may switch one or more antennas 40 into or out of use to ensure that wireless communications circuitry 34 operates as desired.

The presence or absence of external objects such as a user's hand may affect antenna loading and therefore antenna performance. Antenna loading may differ depending on the way in which device 10 is being held. For example, antenna loading and therefore antenna performance may be affected in one way when a user is holding device 10 in the user's right hand and may be affected in another way when a user is holding device 10 in the user's left hand. In addition, antenna loading and performance may be affected in one way when a user is holding device 10 to the user's head and in another way when the user is holding device 10 away from the user's head. To accommodate various loading scenarios, device 10 may use sensor data, antenna measurements, information about the usage scenario or operating state of device 10, and/or other data from input-output circuitry 32 to monitor for the presence of antenna loading (e.g., the presence of a user's hand, the user's head, or another external object). Device 10 (e.g., control circuitry 28) may then adjust tunable components 101 in antenna 40 and/or may switch other antennas into or out of use to compensate for the loading (e.g., multiple antennas 40 may be operated using a diversity protocol to ensure that at least one antenna 40 may maintain satisfactory communications even while the other antennas are blocked by external objects).

Figure 4:
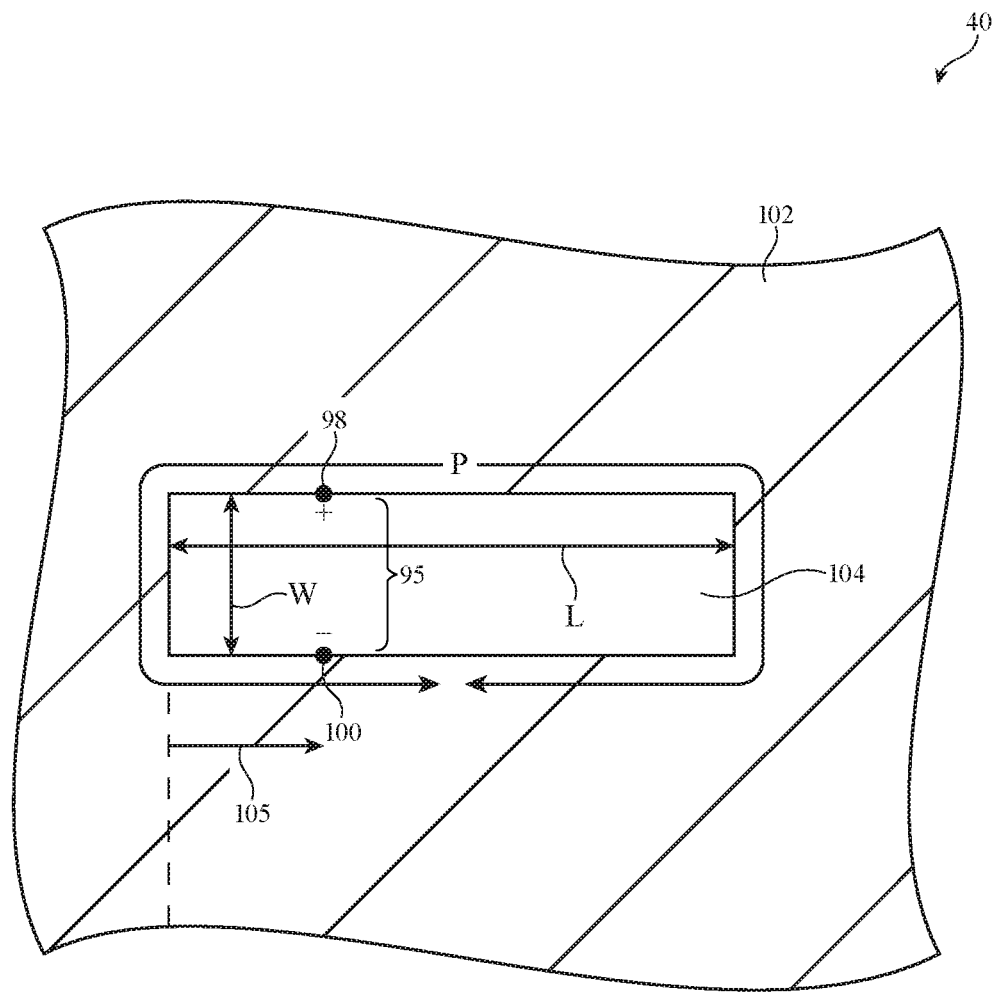
FIG. 4 is a diagram of illustrative slot antenna structures in accordance with an embodiment.

Antennas 40 may include slot antenna structures, inverted-F antenna structures (e.g., planar and non-planar inverted-F antenna structures), loop antenna structures, combinations of these, or any other antenna structures. In one suitable arrangement, antenna 40 may be formed using a slot antenna structure. An illustrative slot antenna structure that may be used for forming antenna 40 is shown in FIG. 4. As shown in FIG. 4, slot antenna 40 may include a conductive structure such as structure 102 that has been provided with a dielectric opening such as dielectric opening 104. Openings such as opening 104 of FIG. 4 are sometimes referred to as slots, slot elements, slot resonating elements, or slot antenna resonating elements of slot antenna 40. In the configuration of FIG. 4, opening 104 is a closed slot, because portions of conductive structure 102 completely surround and enclose opening 104. Open slot antennas may also be formed in conductive materials such as conductive structure 102 (e.g., by forming an opening in the right-hand or left-hand end of conductive structure 102 so that opening 104 protrudes through conductive structure 102).

Antenna feed 95 for antenna 40 may be formed using positive antenna feed terminal 98 and ground antenna feed terminal 100. In general, the frequency response of an antenna is related to the size and shapes of the conductive structures in the antenna. Slot antennas of the type shown in FIG. 4 tend to exhibit response peaks when slot perimeter P is equal to the wavelength of operation of antenna 40 (e.g. where perimeter P is equal to two times length L plus two times width W). Such response peaks may, for example, be associated with electromagnetic standing waves on slot 104. Antenna currents may flow between feed terminals 98 and 100 around perimeter P of slot 104. As an example, where slot length L>>slot width W, the length L of antenna 40 will tend to be about half of the length of other types of antennas such as inverted-F antennas configured to handle signals at the same frequency. Given equal antenna volumes, slot antenna 40 will therefore be able to handle signals at approximately twice the frequency of other antennas such as inverted-F antennas, for example.

Feed 95 may be coupled across slot 104 at a location along length L. For example, feed 95 may be located at a distance 105 from one side of slot 104. Distance 105 may be adjusted to match the impedance of antenna 40 to the impedance of the corresponding transmission line (e.g., transmission line 92 of FIG. 3). For example, the antenna current flowing around slot 104 may experience an impedance of zero at the left and right edges of slot 104 (e.g., a short circuit impedance) and an infinite (open circuit) impedance at the center of slot 104 (e.g., at a fundamental frequency of the slot). Distance 105 from edge 130 may be located between the center of slot 104 and the left edge at a location where the antenna current experiences an impedance that matches the impedance of the corresponding transmission line, for example (e.g., distance 105 may be between 0 and ¼ of the wavelength of operation of antenna 40).

The example of FIG. 4 is merely illustrative. In general, slot 104 may have any desired shape (e.g., where the perimeter P of slot 104 defines resonant characteristics of antenna 40). For example, slot 104 may have a meandering shape with different segments extending in different directions, may have straight and/or curved edges, etc. Conductive structure 102 may be formed from any desired conductive electronic device structures. For example, conductive structure 102 may include conductive traces on printed circuit boards or other substrates, sheet metal, metal foil, conductive structures associated with a display (e.g., display 14 of FIG. 1), conductive portions of the electronic device housing (e.g., conductive walls 12W and/or 12R of FIG. 1), or other conductive structures within device 10. In one suitable arrangement, different sides (edges) of slot 104 may be defined by different conductive structures.

Figure 5:
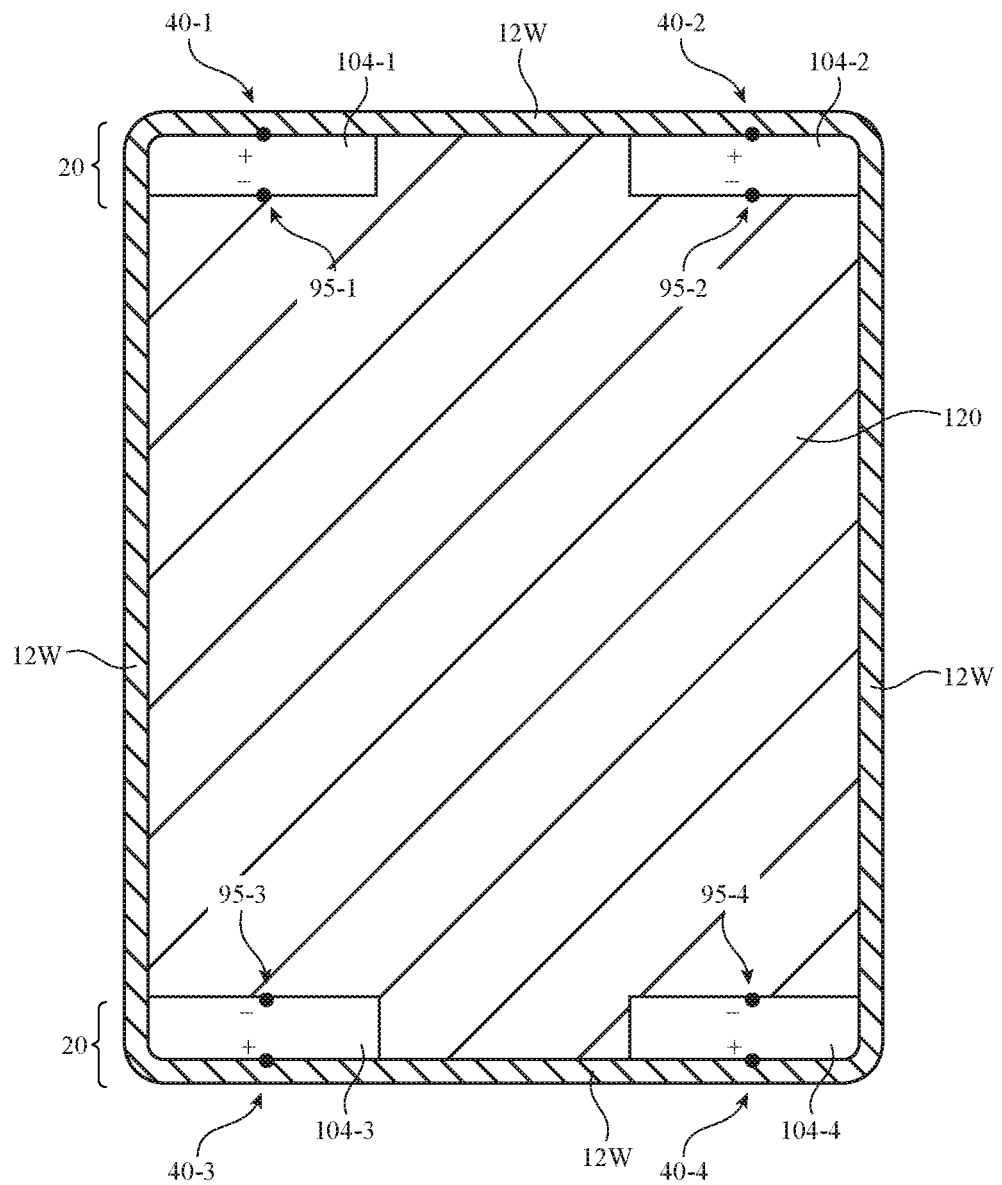
FIG. 5 is a top view of illustrative antenna structures in an electronic device in accordance with an embodiment.

A top interior view of an illustrative device 10 that contains antennas is shown in FIG. 5. As shown in FIG. 5, device 10 may have peripheral conductive housing structures such as peripheral conductive housing sidewalls 12W (e.g., four peripheral conductive housing sidewalls 12W each extending along a respective side of device 10). Peripheral conductive housing sidewalls 12W may be continuous or may be divided by dielectric-filled peripheral gaps (e.g., plastic gaps). A conductive structure such as conductive layer 120 may extend between peripheral conductive housing sidewalls 12W. Conductive layer 120 may be formed from conductive housing structures, conductive structures from electrical device components in device 10, printed circuit board traces, strips of conductor such as strips of wire and metal foil, conductive components in display 14, and/or other conductive structures. In one suitable arrangement, conductive layer 120 is formed from the conductive rear wall of housing 12 (e.g., conductive rear housing wall 12R as shown in FIG. 1).

As shown in FIG. 5, conductive layer 120 (e.g., conductive rear housing wall 12R) may extend between the opposing left and right edges and the opposing top and bottom edges (sidewalls) of device 10. One or more slot antennas 40 may be formed from conductive layer 120 and/or peripheral conductive housing sidewalls 12W (e.g., within regions 20 at the upper and lower ends of device 10 under inactive area IA of display 14, as shown in FIG. 1). The slot elements 104 in each slot antenna 40 may have edges defined by conductive layer 120 and one or more peripheral conductive housing sidewalls 12W. For example, a first slot antenna 40-1 may be formed at the upper-left corner of device 10, a second slot antenna 40-2 may be formed at the upper-right corner of device 10, a third slot antenna 40-3 may be formed at the lower-left corner of device 10, and a fourth slot antenna 40-4 may be formed at the lower-right corner of device 10. Each slot antenna 40 may have a corresponding feed 95 coupled across the corresponding slot element 104 (e.g., antenna 40-1 may have a slot element 104-1 fed by feed 95-1, antenna 40-2 may have a slot element 104-2 fed by feed 95-2, etc.).

Antennas 40-1, 40-2, 40-3, and/or 40-4 may be used to cover the same frequency band or may be used to cover two or more different frequency bands. In scenarios where antennas 40 cover the same band, two or more antennas 40 may be operated using a MIMO scheme to optimize data throughput if desired. If desired, two or more antennas 40 may be operated using an antenna diversity scheme. For example, in scenarios where antennas 40-1 and 40-2 are being blocked by an external object, antennas 40-3 and/or 40-4 may be switched into use, in scenarios where antenna 40-3 is blocked one or more of antennas 40-1, 40-2, and 40-3 may be switched into use, etc.

Slots 104 of antennas 40 may be filled with any desired dielectric material (e.g., air, plastic, ceramic, glass, sapphire, combinations of these, etc.). In the example where conductive layer 120 is formed from conductive rear housing wall 12R of device 10, dielectric material in slots 104 may form part of the exterior surface of device 10 and may lie flush with conductive rear housing wall 12R and/or portions of peripheral conductive housing sidewalls 12W, if desired.

The example of FIG. 5 is merely illustrative. If desired, one, two, three, four, or more than four antennas 40 may be formed within device 10 (e.g., using corresponding slots 104 and feeds 95). Each of slots 104 may have two edges defined by two different peripheral conductive housing sidewalls 12W or, if desired, one or more of slots 104 may have three edges defined by conductive layer 120 and one edge defined by a corresponding peripheral conductive housing sidewall 12W. Antennas 40 may each include slots 104 having the same shape and dimensions or two or more antennas 40 may have slots with different shapes or dimensions. Slots 104 may be rectangular in shape or may have other shapes (e.g., shapes having meandering segments, curved segments, straight segments, etc.). Slots 104 may have curved and/or straight edges. One or more slots 104 may have other orientations. If desired, one or more slots 104 may be completely surrounded by conductive layer 120 (e.g., each of the edges of the slot 104 may be defined by conductive layer 120). One or two of the edges of one or more slots 104 may be defined by a curved portion of housing 12 where peripheral conductive housing sidewalls 12W join with conductive layer 120 (e.g., in scenarios where peripheral conductive housing sidewalls 12W and rear housing wall 12R are formed from a single continuous piece of metal in a unibody configuration). The example of FIG. 5 in which the positive feed terminal of each feed 95 is coupled to a corresponding peripheral conductive housing sidewall 12W and the ground feed terminal of each feed 95 is coupled to conductive layer 120 is merely illustrative. If desired, one or more antennas 40 may have a positive feed terminal coupled to layer 120 and a ground feed terminal coupled to a corresponding peripheral conductive housing sidewall 12W. Device 10 need not have a substantially rectangular periphery and may, if desired, have other shapes.

In practice, the length and perimeter of slot 104 (e.g., length L and perimeter P as shown in FIG. 4) may determine the operating frequencies of a given one of slot antennas 40. However, in practice, it may be desirable for device 10 to be able to cover multiple frequency bands. In some scenarios, separate antennas may be formed to cover additional frequency bands. However, this may consume an excessive amount of valuable space within device 10. If desired, slot antenna 40 may be configured to cover multiple frequency bands, thereby eliminating the need for separate antennas for covering multiple frequency bands. In one suitable arrangement, slot antenna 40 may be configured to concurrently cover three different bands such as a satellite navigation band (e.g., a GPS band centered at 1575 MHz), a wireless local area network (or Bluetooth) band at 2.4 GHz, and a wireless local area network band at 5 GHz.

Figure 6:
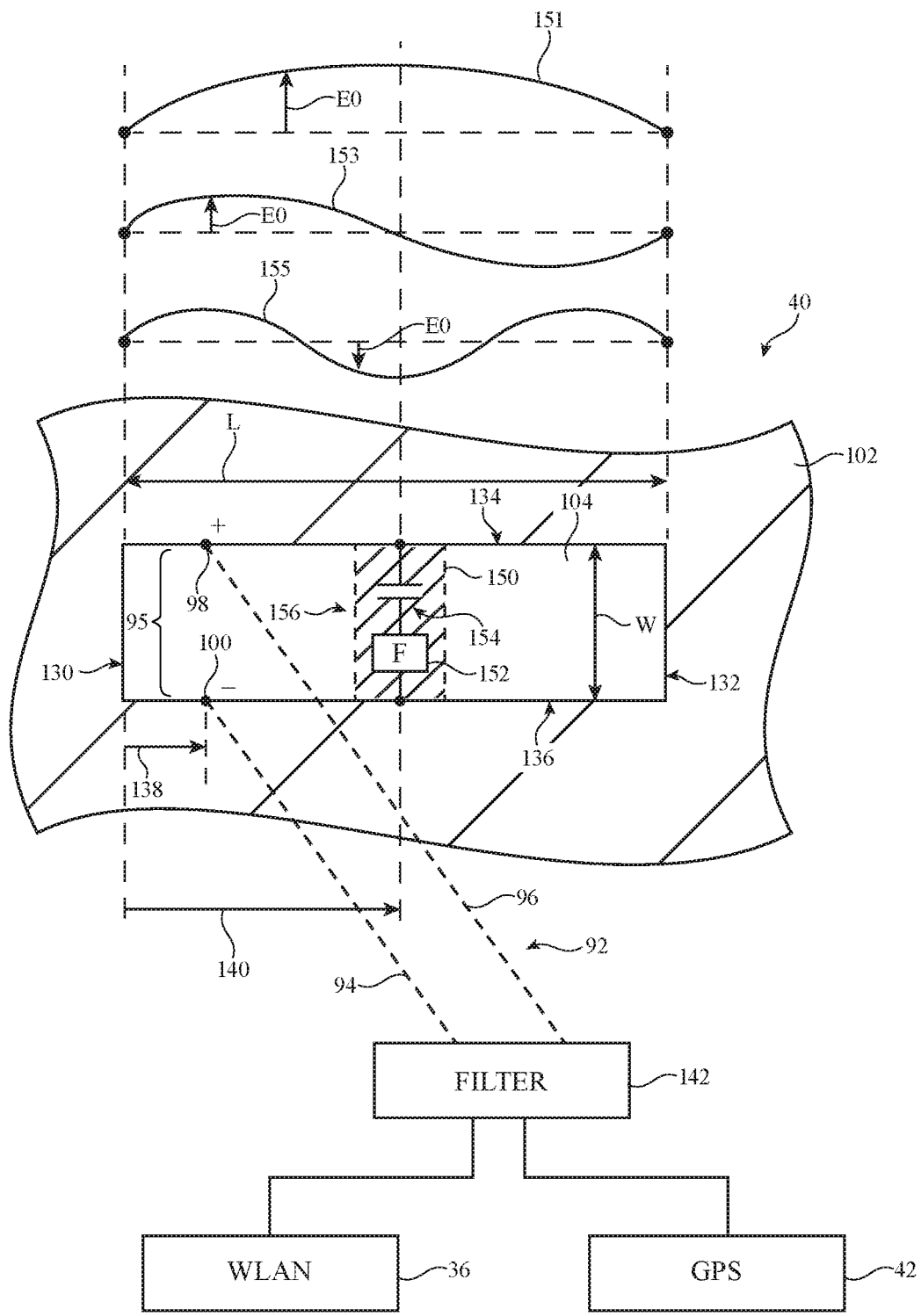
FIG. 6 is a diagram of an illustrative slot antenna having a tuning capacitor and filter for covering multiple frequency bands in accordance with an embodiment.

FIG. 6 is a diagram showing how a given slot antenna 40 (e.g., a given one of slot antennas 40-1, 40-2, 40-3, and 40-4 of FIG. 5) may be configured to cover three different frequency bands such as a satellite navigation band and 2.4 GHz and 5 GHz wireless local area network bands using a single rectangular slot 104.

As shown in FIG. 6, slot antenna 40 may include a slot element 104 between different portions of conductive structures 102. If desired, one or more edges of slot element 104 may be defined by a conductive layer (e.g., conductive layer 120 of FIG. 5) and the remaining edges of slot element 104 may be defined by one or more conductive sidewalls (e.g., peripheral conductive housing sidewalls 12W as shown in FIG. 5). In an example where antenna 40 of FIG. 6 is used to form antenna 40-1 of FIG. 5, edges 134 and 130 of slot 104 may be defined by the left and upper peripheral conductive housing sidewalls 12W of housing 12 whereas edges 136 and 132 of slot 104 are defined by conductive layer 120 (e.g., conductive rear housing wall 12R).

Antenna 40 may be fed using feed 95 coupled across length L of slot 104. For example, positive feed terminal 98 may be coupled to edge 134 of conductive structures 102 (e.g., an edge defined by one of peripheral conductive housing sidewalls 12W) and ground feed terminal 100 may be coupled to edge 136 of conductive structures 102 (e.g., an edge defined by conductive layer 120). Antenna feed 95 may be located at distance 138 from edge 130 of slot 104. Distance 138 may be selected to ensure that feed 95 is impedance matched with transmission line 92. Distance 138 may, for example, be 9 mm, between 5 mm and 10 mm, between 2 mm and 12 mm, or any other suitable distance.

Slot 104 may have a width W perpendicular to length L. In order to ensure that antenna 40 is not blocked by conductive circuitry in display 14, width W may, for example, be limited by the size of inactive area IA of display 14 (FIG. 1). As examples, width W may be approximately 0.9 mm, between 0.5 mm and 1.5 mm, between 0.7 mm and 1.2 mm, etc. Decreasing the size of inactive area IA (and thus width W) may maximize the size of active area AA on display 14 for a user of device 10, for example.

Positive signal conductor 96 of transmission line 92 may be coupled to positive feed terminal 98 whereas ground signal conductor 94 of transmission line 92 may be coupled to ground feed terminal 100. In order to allow the same feed 95 to handle signals in three different frequency bands, transmission line 92 may extend between feed 95 and filter circuitry such as filter 142. Filter 142 may have a first port coupled to transmission line 92, a second port coupled to wireless local area network transceiver 36, and a third port coupled to satellite navigation receiver 42. Filter 142 may isolate the signals conveyed by wireless local area network transceiver circuitry 36 from the signals conveyed by satellite navigation receiver 42. For example, filter 142 may receive radio-frequency signals in both 2.4 GHz and 5 GHz wireless local area network bands from transceiver circuitry 36 (e.g., over different ports of transceiver 36) and may combine the signals before conveying the combined signals to feed 95. Similarly, filter 142 may receive radio-frequency signals from feed 95 and may filter the signals by frequency so that the signals in the 2.4 GHz band (e.g., at frequencies between 2400 MHz and 2500 MHz) and the signals in the 5 GHz band (e.g., at frequencies between 5150 MHz and 5850 MHz) are conveyed to corresponding ports of transceiver 36 while the signals in the satellite navigation band (e.g., at 1575 MHz) are conveyed to receiver 42. Filter 142 may, for example, include a triplexer circuit or any other desired filtering circuitry. The triplexer may, for example, include one or more low-pass filters, band-pass filters, band stop filters, and/or high pass filters. In this way, feed 95 may support communications over both 2.4 GHz and 5 GHz WLAN bands and a satellite navigation band. Other arrangements may be used if desired.

The length L of slot 104 (e.g., the length of parallel edges 134 and 136) may be selected so that antenna 40 handles radio-frequency signals in a desired frequency band. For example, length L may be approximately equal to one-half of a wavelength corresponding to the desired frequency band.

Slot 104 may be characterized by multiple electromagnetic standing wave modes that are associated with different response peaks for antenna 40. These discrete modes may be determined by the dimensions of slot 104 (e.g., length L). For example, the dimensions of slot 104 may define the boundary conditions for electromagnetic standing waves in each of the standing wave modes that are excited on slot 104 by antenna currents conveyed over feed 95 and/or by received radio-frequency signals. Such standing wave modes of slot 104 include a fundamental mode and one or more harmonics of the fundamental mode (i.e., so-called harmonic modes of slot 104). Slot 104 may exhibit antenna performance peaks at frequencies associated with the fundamental mode and one or more of the harmonic modes of slot 104 (e.g., where the harmonic modes are typically at integer multiples of the fundamental modes).

Curves 151, 153, and 155 are shown on FIG. 6 to illustrate some of the standing wave modes of slot 104. As shown in FIG. 6, curves 151, 153, and 155 plot the voltage across slot 104 (perpendicular to length L) at different points along length L. Similarly, curves 151, 153, and 155 may also represent the magnitude of the electric field E0 within slot 104 at different points along length L (e.g., where field E0 extends in a direction parallel to width W). In each mode, nodes in the voltage distribution are present at edges 130 and 132 (e.g., length L establishes boundary conditions for the electromagnetic standing waves produced on slot 104 in the different modes).

Curve 151 represents the voltage distribution across slot 104 in the fundamental mode. As shown in FIG. 6, in fundamental mode 151, the voltage across slot 104 (e.g., in a direction parallel to edges 130 and 132) and the magnitude of electric field E0 reaches a maximum (e.g., an anti-node) at distance 140 from edge 130 of slot 104 (e.g., half way across length L). Dimension L may establish the fundamental mode, where dimension L is approximately one half of the corresponding wavelength of operation. The wavelength of operation may, for example, be an effective wavelength of operation based on the dielectric material within slot 104.

Curve 153 represents the voltage distribution across slot 104 in a first harmonic mode. As shown in FIG. 6, in first harmonic mode 153, the voltage across slot 104 and the magnitude of electric field E0 reach maxima (anti-nodes) at one-quarter and three-quarters of distance L from edge 130. At the same time, in the first harmonic mode the voltage across slot 104 and the magnitude of electric field E0 are at a node (e.g., a minimum or zero-value) at distance 140 from edge 130 of slot 104 (e.g., half way across length L). Antenna 40 may exhibit a response peak associated with the first harmonic mode at a frequency that is approximately twice the frequency associated with fundamental mode 151, for example.

Curve 155 represents the voltage distribution across slot 104 in a second harmonic mode. As shown in FIG. 6, in second harmonic mode 155, the voltage across slot 104 and the magnitude of electric field E0 reach maxima (anti-nodes) at one-sixth, one-half, and five sixths of distance L from edge 130. At the same time, the voltage across slot 104 and the magnitude of electric field E0 form nodes at one-third and two-thirds of distance L from edge 130. Antenna 40 may exhibit a response peak associated with the second harmonic mode at a frequency that is approximately three times the frequency associated with fundamental mode 151, for example. While the example of FIG. 6 only shows three standing wave modes, higher order harmonics may be present on slot 104 in practice.

Modes 151, 153, and/or 155 may support coverage in corresponding frequency bands for antenna 40. In one suitable arrangement, it may be desirable to cover a satellite navigation frequency band at 1575 MHz, a 2.4 GHz WLAN frequency band, and a 5 GHz WLAN frequency band using two or more of modes 151, 153, and 155. However, because frequencies in the 2.4 GHz band are not a perfect integer multiple of frequencies in the 1575 MHz band and frequencies in the 5 GHz band are not perfect integer multiples of frequencies in the 1575 and 2.4 GHz bands, the dimensions of slot 104 in themselves may be insufficient for covering all three of these frequency bands. If desired, antenna components may be coupled across slot 104 that configure antenna 40 to cover these frequency bands using two or more of modes 151, 153, and 155.

If desired, dielectric structures such as dielectric structure 150 may be formed at one or more locations within slot 104. Dielectric structure 150 may, for example, have a higher dielectric constant than the other dielectric material that fills slot 104. Dielectric structure 150 may dielectrically load slot 104 to increase effective electrical length of slot 104 at one or more frequencies covered by slot 104. Increasing the effective electrical length may serve to shift the corresponding frequencies covered by slot 104 to lower frequencies. Dielectric structure 150 may be placed within slot 104 at a selected location such that dielectric structure 150 loads slot 104 at some frequencies but not at others (e.g., so that the effective electrical length and the corresponding operating frequency of slot 104 is shifted lower for some frequencies but not for others).

In practice, dielectric structure 150 may load slot 104 in a particular frequency band when dielectric structure 150 is located at an anti-node of the standing wave mode for that band. For example, dielectric structure 150 may be placed within slot 104 at distance 140 from edge 130. At this location, dielectric structure 150 may dielectrically load slot 104 at frequencies that are covered by fundamental mode 151 and second harmonic mode 155, which exhibit anti-nodes and thus relatively strong electric fields at distance 140 from edge 130 (e.g., relatively strong electric fields may interact more strongly with tuning components and/or dielectrics than relatively weak electric fields). Dielectric structure 150 may thereby serve to increase the effective electrical length of slot 104 at the frequencies associated with modes 151 and 155 when structure 150 is placed at distance 140 from edge 130 (thereby shifting the corresponding frequencies associated with modes 151 and 155 to lower frequencies). However, dielectric structure 150 may not have any frequency impact on mode 153, which has a node (e.g., zero electric field magnitude) at distance 140 from edge 130. Distance 140 from edge 130 may sometimes be referred to herein as location 140.

In order to support satisfactory standing wave ratio and antenna efficiency at frequencies in each of the three frequency bands to be handled by antenna 40, a tuning circuit such as tuning component 156 may be coupled between edges 134 and 136 of slot 104 (e.g., a tuning circuit that includes as tuning components 101 of FIG. 3). Tuning component 156 may be coupled across slot 104 at a distance 140 from edge 130 of slot 104. Distance 140 may, for example, be approximately equal to one-half of length L (e.g., within 15% of one-half of length L).

The placement of tuning component 156 may be selected so that tuning component 156 impacts the performance of antenna 40 at some frequencies but not at others. In practice, tuning component 156 may affect the performance of antenna 40 in a particular frequency band when the tuning component is located at an anti-node of the standing wave mode for that band. For example, at distance 140 from edge 130, tuning component 156 may be capable of impacting the frequency response of antenna 40 at frequencies that are covered by fundamental mode 151 and second harmonic mode 155, which have antinodes and thus relatively strong electric fields at distance 140 from edge 130. However, tuning component 156 may not have any frequency impact on mode 153, which has a node at distance 140 from edge 130.

Tuning component 156 may include a capacitive circuit such as capacitor 154 coupled in series with a filter circuit such as filter 152 between edges 134 and 136 of slot 104. Filter 152 may, for example, be a notch filter or a low pass filter that forms a short circuit at satellite navigation frequencies such as 1575 MHz and that forms an open circuit at higher frequencies such as frequencies in the 2.4 GHz and 5 GHz wireless local area network bands.

When filter 152 forms an open circuit (e.g., at WLAN frequencies), capacitor 154 is floating and does not impact the frequency response of antenna 40. However, when filter 152 forms a short circuit path (e.g., at GPS frequencies), capacitor 154 may be coupled to edge 136 and may serve to increase the effective electrical length of slot 104. Because filter 152 may be configured to form a short circuit at frequencies associated with fundamental mode 151 and an open circuit at frequencies associated with harmonic mode 155, capacitor 154 may increase the effective electrical length of slot 104 to shift corresponding frequencies associated with fundamental mode 151 lower without affecting the frequency response associated with harmonic mode 155. Because capacitor 154 is located at a node of harmonic mode 153, capacitor 154 may not affect the frequency response associated with mode 153 regardless of whether filter 152 forms an open or closed circuit. When configured in this way, the frequency response of slot 104 may cover frequencies in all three of the 1575 MHz GPS band, the 2.4 GHz WLAN band, and the 5 GHz WLAN band with satisfactory efficiency.

Figure 7:
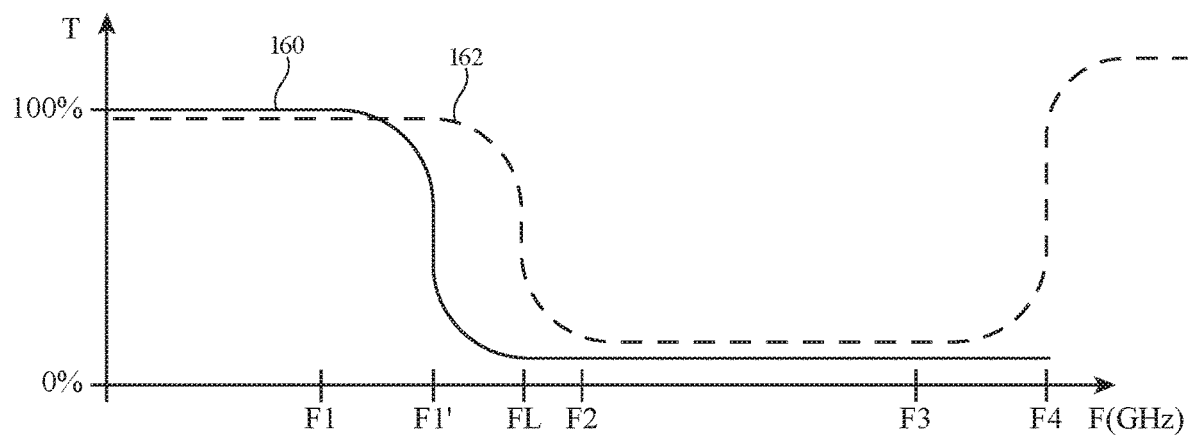
FIG. 7 is a diagram showing how frequency responses of illustrative filter circuitry of the type shown in FIG. 6 may be configured in accordance with an embodiment.

Some possible transmissions T that may be exhibited by filter of FIG. 6 as a function of frequency are shown in FIG. 7. In the graph of FIG. 7, the transmission of filter 152 when formed using a low pass filter is represented by the transmission characteristic of line 160, whereas the transmission of filter 152 when formed using a notch filter is represented by the transmission characteristic of line 162.

As indicated by line 160, when configured as a low pass filter, filter 152 may block signals with frequencies greater than frequency F1' and may pass signals with frequencies less than cutoff frequency F1' such as frequency F1. Frequency F1 may, for example, be a frequency within the 1575 MHz GPS band handled by antenna 40. At frequencies less than cutoff frequency F1', capacitor 154 may be electrically connected in series between edges 134 and 136 of slot 104. At frequencies greater than cutoff frequency F1' such as frequencies F2 and F3, an open circuit may be formed between edges 134 and 136 at the location of component 156. Frequency F2 may, for example, correspond to a frequency within the 2.4 GHz WLAN band (e.g., between 2400 MHz and 2500 MHz) whereas frequency F3 may correspond to a frequency within the 5 GHz WLAN band (e.g., between 5150 MHz and 5850 MHz). In this way, capacitor 154 may be invisible to signals at WLAN frequencies and may affect the radiating characteristics of antenna 40 at GPS frequencies.

As indicated by line 162, when configured as a notch filter, filter 152 may pass signals at frequencies outside of a stop band between cutoff frequencies FL and FH and may block signals at frequencies within the stop band between cutoff frequencies FL and FH. The notch filter may be configured so that the stop band of the filter overlaps with both frequencies F2 and F3 (e.g., so that the stop band overlaps the 2.4 GHz and 5 GHz WLAN bands). When configured as a notch filter, at frequencies greater than frequency FL and less than frequency FH, an open circuit may be formed between edges 134 and 136 at the location of component 156 (e.g., capacitor 154 may be invisible to signals in the 2.4 GHz and 5 GHz WLAN bands). At frequencies outside of the stop band such as GPS frequencies at frequency F1, capacitor 154 may be coupled between sides 134 and 136 of slot 104 and may affect the radiating characteristics of antenna 40 at GPS frequencies. Frequency FL may be, for example, 2400 MHz, 2300 MHz, 2200 MHz, 2000 MHz, or any other desired frequency between frequencies F1 and F2. Frequency FH may be, for example, 5850 MHz, 5500 MHz, or any other desired frequency greater than frequency F3. The examples of FIG. 7 are merely illustrative and, in general, any desired filter structures may be used.

Figure 8:
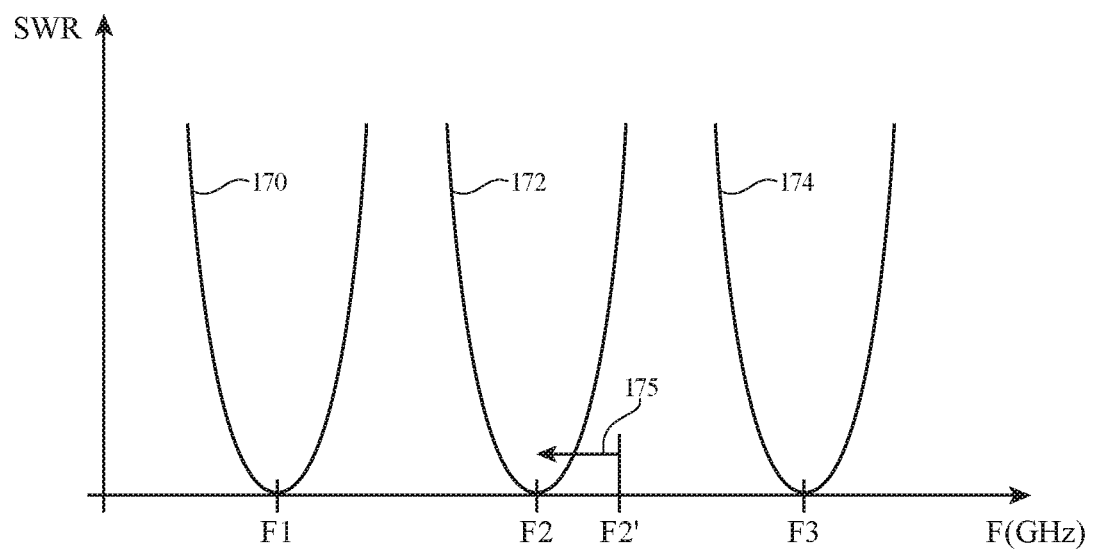
FIG. 8 is a graph of antenna performance (standing wave ratio) associated with use of illustrative antenna structures of the type shown in FIG. 6 in accordance with an embodiment.

FIG. 8 is a graph in which antenna performance (standing wave ratio) has been plotted as a function of frequency for antenna 40 having tuning circuit 156 coupled across slot 104. Three performance curves are shown in FIG. 8. The length L of slot 104 may be selected to be approximately equal to one half of the wavelength corresponding to frequency F2'. As an example, frequency F2' may be approximately 2.7 GHz. The fundamental mode of slot 104 may therefore support communications in a frequency band around F2' (e.g., around 2.7 GHz). The first harmonic mode of slot 104 may be present at frequency F3, which is approximately two times frequency F2' (e.g., around 5.4 GHz). Response curve 174 may exhibit a bandwidth that extends across the 5 GHz WLAN frequency band (e.g., from 51510 MHz to 5850 MHz). This harmonic mode of slot 104, as represented by response curve 174, may allow antenna 40 to support communications at any desired frequencies within the 5 GHz WLAN frequency band (e.g., at frequency F3 or other frequencies from 5150 MHz to 5850 MHz).

The first harmonic mode of the 2.4 GHz WLAN band may include frequencies that are too low to sufficiently cover the 5 GHz WLAN band (i.e., the first harmonic mode of the 2.4 GHz band may be approximately two times 2.4 GHz or 4.8 GHz). Therefore, selecting length L to allow the fundamental mode of slot 104 to cover a frequency band around 2.7 GHz may push the first harmonic mode into frequencies within the 5 GHz WLAN band.

In order to recover a response in the 2.4 GHz WLAN band, dielectric structure 150 may be formed at distance 140 from edge 130 within slot 104 (FIG. 6). The presence of dielectric structure 150 at distance 140 from edge 130 may dielectrically load slot 104 at the fundamental mode (e.g., at frequencies around 2.7 GHz) to increase the effective electrical length of slot 104. This may serve to push the fundamental frequency to a lower frequency such as frequency F2, as shown by arrow 175 and response curve 172. Frequency F2 may, for example, be 2.4 GHz. Response curve 172 may exhibit a bandwidth that extends across the 2.4 GHz WLAN frequency band (e.g., from 2400 MHz to 2500 MHz). The presence of dielectric structure 150 may not dielectrically load slot 104 at the first harmonic of slot 104 (e.g., at frequencies in the 5 GHz WLAN band as shown by curve 174), because distance 140 from edge 130 is at a node of the first harmonic mode, as shown by curve 153 of FIG. 6. Dielectric structure 150 therefore will not reduce response curve 174 to frequencies below the 5 GHz WLAN frequency band.

In order to allow slot 104 to cover frequency F1 (e.g., a GPS frequency at 1575 MHz), capacitor 154 and filter 152 may be coupled in series between edges 134 and 136 of slot 104. Component 156 may be invisible to the first harmonic mode of slot 104 associated with curve 174 (e.g., because there is a node at distance 140 from edge 130 in mode 153 as shown in FIG. 6). However, tuning circuit 156 may be visible to frequencies towards the lower end of the fundamental mode of slot 104. Capacitor 154 may serve to increase the effective electrical length of slot 104 at these frequencies, thus pulling the corresponding response down to frequency F1, as shown by curve 170. Filter 152 may block fundamental mode signal in the 2.4 GHz WLAN band (curve 172) from being pulled further down (e.g., because filter 152 exhibits an approximately 0% transmission characteristic in the 2.4 GHz WLAN band, as shown in FIG. 7). In this way, a single rectangular slot 104 may be configured to cover all three of the 1575 MHz GPS band, the 2.4 GHz WLAN band, and the 5.0 GHz WLAN band.

In the example of FIGS. 6-8, space constraints within device 10 may make it infeasible for length L to be long enough to be approximately equal to half of a wavelength of the 1575 MHz GPS frequency band. However, in some scenarios there may be sufficient space within device 10 to allow length L to be long enough to be approximately half of the wavelength of operation in the 1575 MHz GPS frequency band. When such space exists, slot antenna 40 may be configured as shown in FIG. 9 (if desired).

Figure 9:
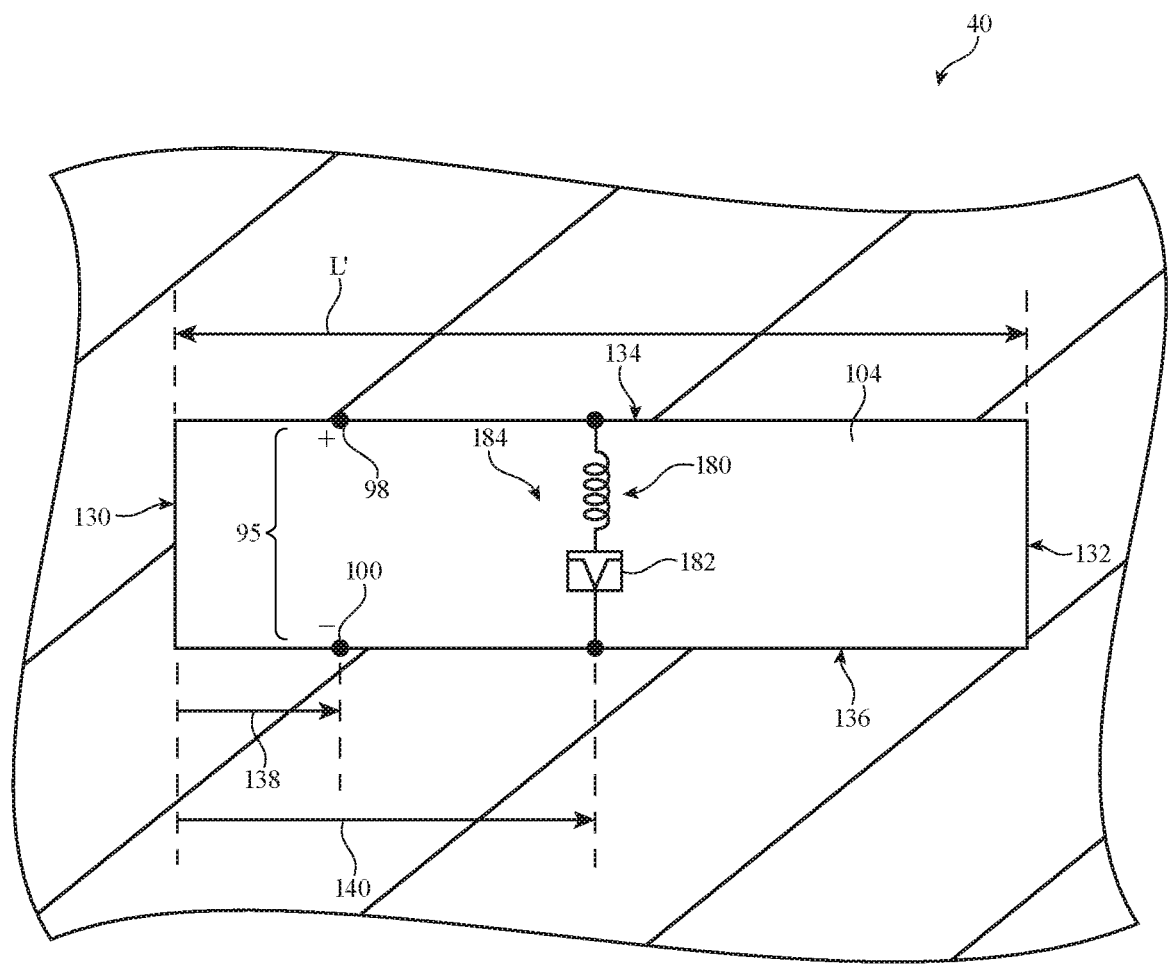
FIG. 9 is a diagram of an illustrative slot antenna having a tuning inductor and filter for covering multiple frequency bands in accordance with an embodiment.

As shown in FIG. 9, slot 104 may have a length L' that is greater than length L of FIG. 6. Length L' may be approximately half of the wavelength of signals in the 1575 MHz GPS frequency band. In this scenario, tuning circuit 184 may be coupled between edge 134 and edge 136 of slot 104 at distance 140 from edge 130 (e.g., in place of component 156 of FIG. 6). Tuning circuit 184 may be capable of impacting the radiation characteristics of antenna 40 at standing wave modes for which the electric field within slot 104 (i.e., the voltage across slot 104) exhibits an anti-node or maximum magnitude at distance 140 from edge 130 (e.g., fundamental mode 151 or second harmonic 155 as shown in FIG. 6). Tuning circuit 184 may be incapable of affecting the radiation characteristics of antenna 40 at harmonic modes of slot 104 for which the electric field within slot 104 exhibits a node or minimum magnitude at distance 140 from edge 130 (e.g., first harmonic mode 153 as shown in FIG. 6).

As shown in FIG. 9, tuning circuit 184 may include an inductive circuit such as inductor 180 coupled in series with a notch filter 182 between edges 134 and 136. Notch filter 182 may have a stop band that overlaps with frequencies in the 1575 GPS band. Inductor 180 may serve to decrease the effective electrical length of slot 104 and therefore increase the corresponding frequency when shorted to edge 136 by notch filter 182 (e.g., at frequencies outside of the stop band of notch filter 182). Inductor 180 may have no effect on the electrical length and radiating characteristics of slot 104 when notch filter 182 forms an open circuit (e.g., at frequencies within the stop band of notch filter 182).

Figure 10:
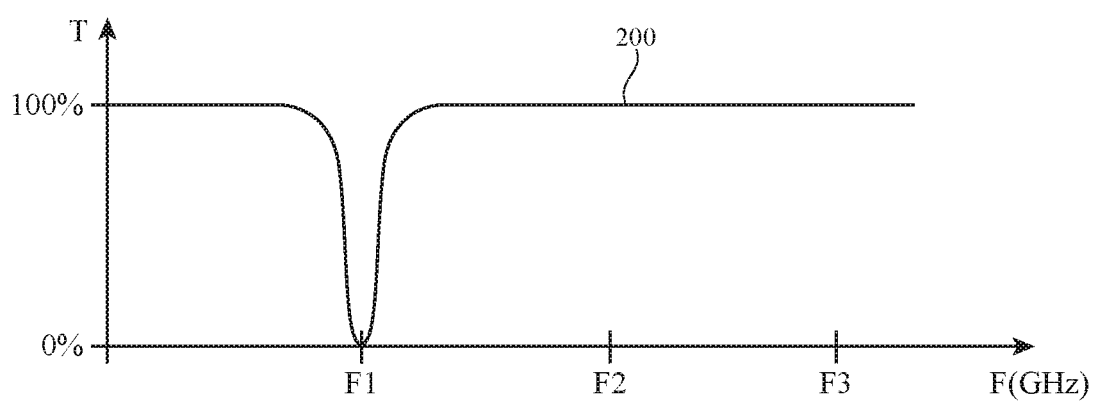
FIG. 10 is a diagram showing how a frequency response of illustrative filter circuitry of the type shown in FIG. 9 may be configured in accordance with an embodiment.

A transmission T that may be exhibited by notch filter 182 of FIG. 9 as a function of frequency is shown in FIG. 10. In the graph of FIG. 10, the transmission of notch filter 182 is represented by the transmission characteristic of line 200.

As indicated by line 200, notch filter 182 may have a stop band that overlaps with frequency F1 (e.g., frequencies in the GPS band around 1575 MHz). At frequencies outside of the stop band, such as frequencies F2 and F3, notch filter 182 may form a short circuit and may pass signals between inductor 180 and edge 136 of slot 104. At frequencies within the stop band, such as frequency F1, notch filter 182 may form an open circuit and may block signals from flowing between inductor 180 and edge 136 of slot 104.

Figure 11:
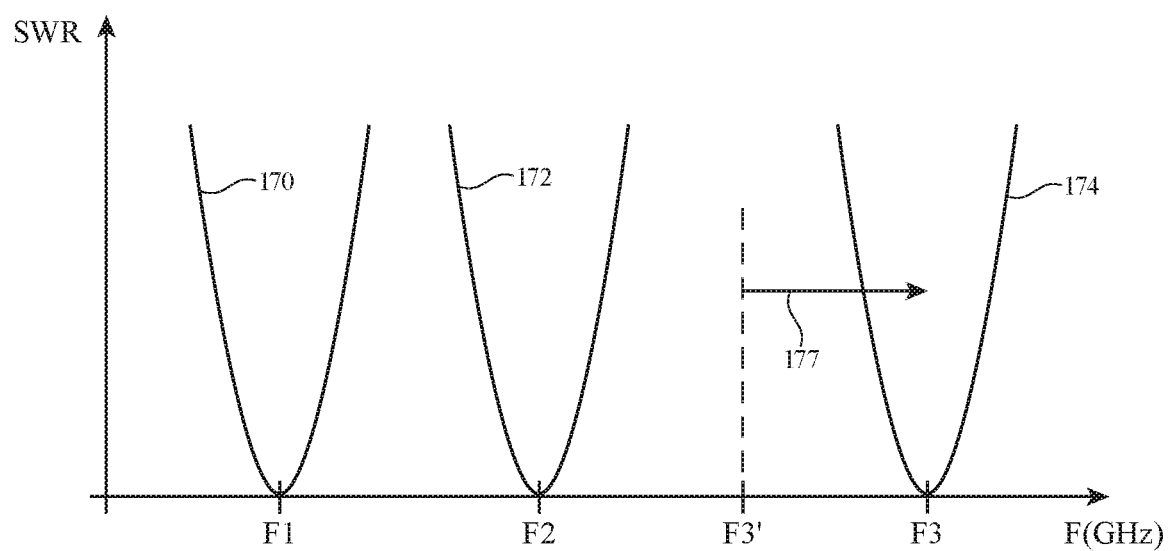
FIG. 11 is a graph of antenna performance (standing wave ratio) associated with use of illustrative antenna structures of the type shown in FIG. 9 in accordance with an embodiment.

FIG. 11 is a graph in which antenna performance (standing wave ratio) has been plotted as a function of frequency for antenna 40 having tuning circuit 184 coupled across slot 104. As shown in FIGS. 9 and 11, length L' of slot 104 may be selected to be approximately one-half of the wavelength corresponding to frequency F1 (e.g., 1575 MHz). The fundamental mode of slot 104 may therefore support coverage at frequency F1, as shown by response curve 170. The first harmonic mode of slot 104 (e.g., at two times F1 or approximately 3 GHz) may be sufficiently broad so as to cover frequencies in the 2.4 GHz frequency band, as shown by curve 172. If desired, dielectric structures such as structure 150 of FIG. 6 may be formed at various locations within slot 104 to further adjust the first harmonic frequency to cover frequency F2.

The second harmonic mode of slot 104 may cover a band centered around frequency F3' (e.g., three times F1 or approximately 4.5 GHz). This may be too low to sufficiently cover frequencies in the 5 GHz WLAN band. However, at frequency F3' (e.g., 4.5 GHz) notch filter 182 may short inductor 180 to edge 136 of slot 104 (e.g., because the stop band of notch filter 182 does not overlap frequency F3'). Because the electric field (voltage) magnitude across slot 104 at distance 140 from edge 130 (i.e., the location of inductor 180) is an anti-node or maximum for this second harmonic mode, inductor 180 may decrease the effective electrical length of slot 104 at frequency F3', thereby serving to push the second harmonic mode to higher frequencies within the 5 GHZ WLAN band, as shown by arrow 177. In this way, the second harmonic of slot 104 may support communications in the 5 GHz WLAN band centered at frequency F3 (e.g., from 5150 to 5850 MHz), as shown by response curve 174. Because the stop band of notch filter 182 overlaps with GPS frequency F1, inductor 180 may be invisible at frequency F1 and may thereby not pull the fundamental mode off of frequency F1, even though the electric field across slot 104 is a maximum at distance 140 from edge 130 in the fundamental mode. In this way, a single rectangular slot 104 may be configured to cover all three of the 1575 MHz GPS band, the 2.4 GHz WLAN band, and the 5.0 GHz WLAN band (e.g., in scenarios where sufficient space in device 10 is present for slot 104 to have length L').

In the examples of FIGS. 6 and 9, antenna 40 is fed using a single feed 95 that handles signals in all three frequency bands of interest. This is merely illustrative. If desired, separate feeds may be used for handling WLAN signals and GPS signals.

Figure 12:
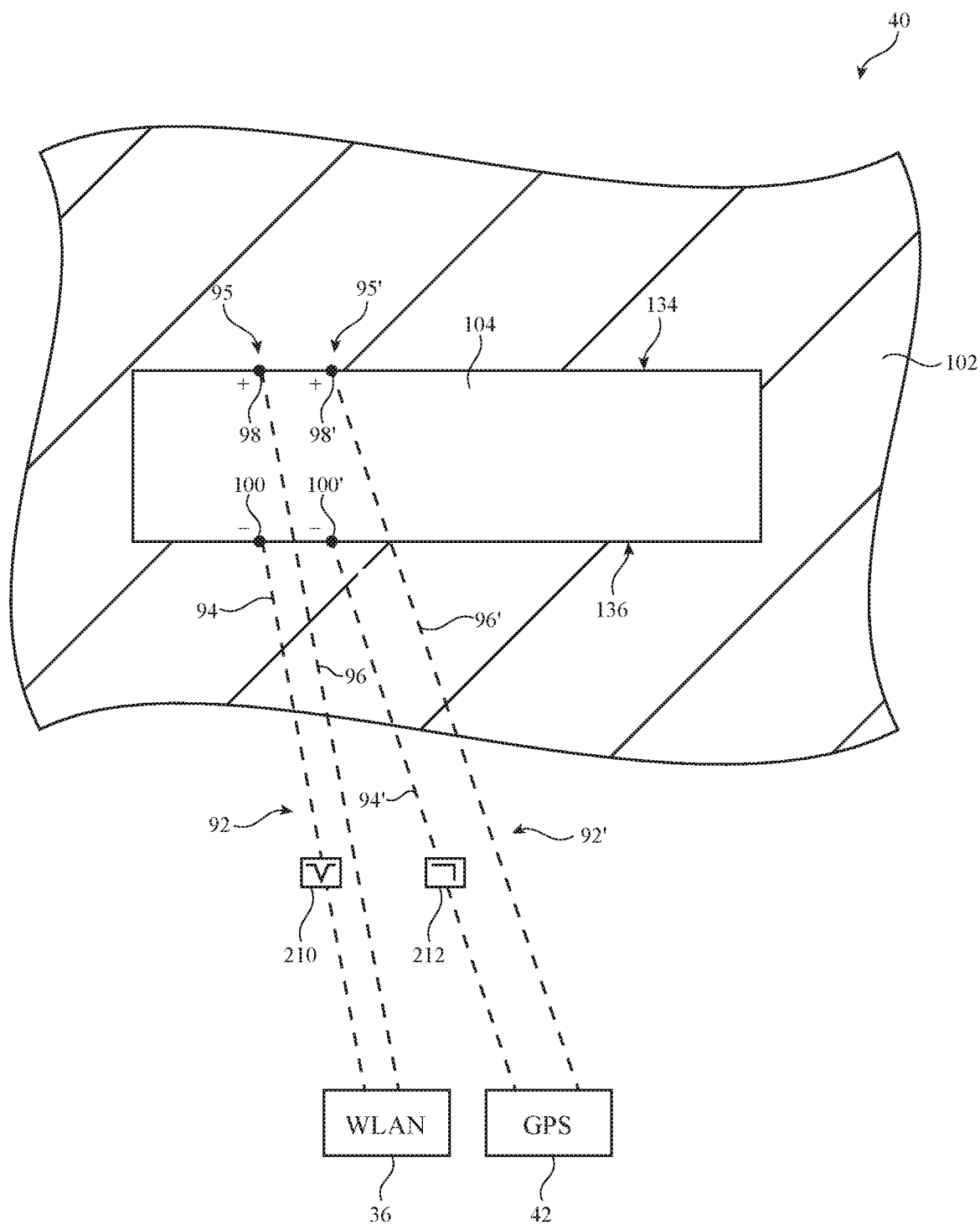
FIG. 12 is a diagram showing how illustrative antenna structures of the type shown in FIGS. 6 and 9 may be fed using multiple antenna feeds in accordance with an embodiment.

FIG. 12 is a diagram showing how antenna 40 may be fed using separate feeds. As shown in FIG. 12, WLAN transceiver 36 may be coupled to feed 95 over transmission line 92. A second feed 95' may be coupled across slot 104 (e.g., adjacent to feed 95 or at any other desired location along the length of slot 104). Feed 95' may include a positive feed terminal 98' and a ground feed terminal 100'. GPS receiver circuitry 42 may be coupled to feed 95' over transmission line 92'. For example, signal conductor 96' of transmission line 92' may be coupled to feed terminal 98' whereas ground conductor 94' of transmission line 92' may be coupled to feed terminal 100'.

A filter such as notch filter 210 may be interposed on transmission line 92 (e.g., on conductor 94 and/or conductor 96) between feed 95 and WLAN transceiver 36. Notch filter 210 may have a stop band that overlaps with the 2.4 GHz and 5 GHz WLAN frequency bands (e.g., similar to as shown by characteristic 162 of FIG. 7). Notch filter 210 may allow signals at WLAN frequencies to pass between transceiver 36 and feed 95 while blocking other signals such as GPS signals.

A filter such as low pass filter 212 may be interposed on transmission line 92' (e.g., on conductor 94' and/or conductor 96') between feed 95 and GPS receiver 42. Low pass filter 212 may have a transfer characteristic similar to as shown by curve 160 of FIG. 7. Low pass filter 212 may allow signals at relatively low frequencies such as GPS signals to pass between transceiver 42 and feed 95' while blocking other signals such as WLAN signals. In this way, transceivers 36 and 42 may be sufficiently isolated while communicating using the same slot element 104. The dual-feed arrangement of FIG. 12 may be used in combination with a slot having length L and tuning circuit 156 (as shown in FIG. 6) or with a slot having length L' and tuning circuit 184 (as shown in FIG. 9). Using two separate feeds may, for example, incur less filter loss than the arrangement in FIGS. 6 and 9 (e.g., because filters 210 and 212 of FIG. 12 may be 50-Ohm filters and may contribute less loss to the conveyed signals than a triplexer in filter 142 of FIG. 6).

The example of FIGS. 6-12 are merely illustrative. In general, antenna 40 may cover any desired frequency bands. Antenna 40 may cover more than three or fewer than three frequency bands if desired. Curves 170, 172, and 174 of FIGS. 8 and 11 may have any desired shape (e.g., so that antenna 40 exhibits a desired frequency response in one or more bands).

By configuring one or more slot antennas 40 in device 10 (e.g., one or more of antennas 40-1, 40-2, 40-3, and 40-4 of FIG. 5) using the slot antenna structures of FIGS. 6-12, device 10 may perform wireless communications over three or more frequency bands using the same relatively small slot structure 104. This may, for example, eliminate the need for other antennas in device 10 for covering respective frequency bands and may minimize the amount of volume in device 10 required to cover these bands. This minimization in volume may, for example, allow active area AA of display 14 (FIG. 4) to be maximized, thereby maximizing the area on device 10 with which a user may interact with device 10, for example.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a housing having peripheral conductive structures;
   a conductive layer extending between the peripheral conductive structures, wherein the conductive layer and the peripheral conductive structures define edges of a slot element in a slot antenna, wherein the slot element has opposing first and second edges;
   an antenna feed for the slot antenna that is coupled across the slot element between opposing third and fourth edges of the slot element at a first distance from the first edge;
   radio-frequency transceiver circuitry coupled to the antenna feed and configured to convey radio-frequency signals in a first frequency band, a second frequency band that is greater than the first frequency band, and a third frequency band that is greater than the second frequency band using the slot element; and an antenna tuning circuit for the slot antenna that tunes the antenna when the radio-frequency transceiver circuitry conveys radio-frequency signals with the antenna feed, wherein the antenna tuning circuit is coupled across the slot element between the opposing third and fourth edges of the slot element at a second distance from the first edge.

2. The electronic device defined in claim 1, wherein the antenna tuning circuit comprises an inductor and a filter coupled in series between the peripheral conductive structures and the conductive layer.

3. The electronic device defined in claim 2, wherein the filter comprises a notch filter.

4. The electronic device defined in claim 3, wherein the notch filter has a stop band that overlaps with the first frequency band and that does not overlap with the second and third frequency bands.

5. The electronic device defined in claim 4, wherein the slot element has a fundamental mode configured to cover the first frequency band and a second harmonic of the fundamental mode is configured to cover the second frequency band.

6. The electronic device defined in claim 5, wherein the slot element has a length extending between the opposing first and second edges of the slot element, the length is approximately equal to one half of a wavelength of operation of the slot element that is associated with the fundamental mode, and the antenna tuning circuit is coupled between the opposing third and fourth edges of the slot element at a location that is approximately half way between the first and second edges of the slot element.

7. The electronic device defined in claim 6, wherein the first frequency band comprises a satellite navigation frequency band at 1575 MHz, the second frequency band comprises a first wireless local area network frequency band between 2400 MHz and 2500 MHz, and the third frequency band comprises a second wireless local area network frequency band between 5150 MHz and 5850 MHz.

8. The electronic device defined in claim 6, wherein the first and third edges of the slot element are defined by the peripheral conductive structures and the second and fourth edges of the slot element are defined by the conductive layer.

9. The electronic device defined in claim 8, further comprising:
a display, wherein the housing comprises a rear housing wall that opposes the display, the peripheral conductive structures comprise conductive sidewalls of the housing extending between the rear housing wall and the display, and the conductive layer comprises the rear housing wall.

10. The electronic device defined in claim 1, wherein the antenna tuning circuit comprises a capacitor and a filter coupled in series between the peripheral conductive structures and the conductive layer.

11. The electronic device defined in claim 10, wherein the filter is selected from the group consisting of: a notch filter having a stop band that overlaps with the second and third frequency bands and that does not overlap with the first frequency band and a low pass filter that is configured to pass signals in the first frequency band and to block signals in the second and third frequency bands.

12. The electronic device defined in claim 11, wherein the slot element has a fundamental mode configured to cover the first and second frequency bands and a first harmonic of the fundamental mode is configured to cover the third frequency band.

13. The electronic device defined in claim 12, wherein the slot element has a length extending between the opposing first and second edges of the slot element, the length is approximately equal to one half of a wavelength of operation of the slot element corresponding to a frequency in the second frequency band, and the antenna tuning circuit is coupled between opposing third and fourth edges of the slot element at a location that is approximately half way between the first and second edges of the slot element.

14. The electronic device defined in claim 13, further comprising:
a dielectric structure within the slot element at the location that is approximately half way between the first and second edges of the slot element.

15. The electronic device defined in claim 13, wherein the transceiver circuitry comprises a first transceiver configured to handle the first frequency band and a second transceiver configured to handle the second and third frequency bands, the electronic device further comprising:
a triplexer coupled between the first and second transceivers and the antenna feed.

16. The electronic device defined in claim 1, wherein the third edge has a length that is approximately equal to one-half of a wavelength of operation associated with a fundamental mode of the slot element, the fundamental mode of the slot element is configured to cover wireless communications in the first frequency band, and a harmonic mode of the slot element is configured to cover wireless communications in the second frequency band.

17. The electronic device defined in claim 16, wherein the antenna tuning circuit comprises:
an antenna tuning component coupled between the third and fourth edges of the slot element at a location that is approximately halfway between the first and second edges of the slot element, wherein the antenna tuning component comprises an inductor coupled in series with a notch filter between the third and fourth edges of the slot element and the notch filter has a stop band that overlaps with the first frequency band.

18. The electronic device defined in claim 16, wherein the antenna tuning circuit comprises:
an antenna tuning component coupled between the third and fourth edges of the slot element at a location that is approximately halfway between the first and second edges of the slot element, wherein the antenna tuning component comprises a capacitor coupled in series with a filter between the third and fourth edges of the slot element and the filter is configured to pass signals between the third and fourth edges in the first frequency band and to block signals from passing between the third and fourth edges in the second frequency band.

19. The electronic device defined in claim 16, further comprising:
an additional antenna feed coupled across the slot element;
a first transceiver coupled to the antenna feed over a first radio-frequency transmission line and configured to generate radio-frequency signals in the first frequency band;
a second transceiver coupled to the additional antenna feed over a second radio-frequency transmission line and configured to generate radio-frequency signals in the second frequency band;

a notch filter interposed on the second radio-frequency transmission line, wherein the notch filter has a stop band that overlaps with the first frequency band; and a low pass filter interposed on the first radio-frequency transmission line, wherein the low pass filter has a cutoff frequency between the first and second frequency bands.

20. The electronic device defined in claim 1, the electronic device further comprising:

a filter circuit coupled between the third and fourth edges of the slot element, wherein the slot element is configured to convey radio-frequency signals in a 1575 MHz satellite navigation frequency band, a 2.4 GHz wireless local area network frequency band, and a 5 GHz wireless local area network frequency band.

21. An electronic device, comprising:

a housing having peripheral conductive structures;

a conductive layer extending between the peripheral conductive structures, wherein the conductive layer and the peripheral conductive structures define edges of a slot element in a slot antenna;

an antenna feed for the slot antenna that is coupled across the slot element at a first location;

radio-frequency transceiver circuitry coupled to the antenna feed and configured to convey radio-frequency signals in a first frequency band, a second frequency band that is greater than the first frequency band, and a third frequency band that is greater than the second frequency band using the slot element and the antenna feed; and an antenna tuning circuit for the slot antenna that tunes the antenna when the radio-frequency transceiver circuitry conveys the radio-frequency signals in the first frequency band, wherein the antenna tuning circuit is coupled across the slot element parallel to the antenna feed at a second location that is different from the first location.

22. An electronic device, comprising:

a housing having peripheral conductive structures;

a conductive layer extending between the peripheral conductive structures, wherein the conductive layer and the peripheral conductive structures define edges of a slot element in a slot antenna;

an antenna feed for the slot antenna that is coupled across the slot element;

radio-frequency transceiver circuitry coupled to the antenna feed and configured to convey radio-frequency signals in a first frequency band, a second frequency band that is greater than the first frequency band, and a third frequency band that is greater than the second frequency band using the slot element and the antenna feed; and an antenna tuning circuit for the slot antenna that is coupled across the slot element, wherein the antenna tuning circuit includes a filter that forms an open circuit at one of the first, second, or third frequency bands.

\* \* \* \* \*